United States Patent [19]
Doerman et al.

[11] 3,943,752
[45] Mar. 16, 1976

[54] TESTING OF CIGARETTES

[75] Inventors: Eryk Stefan Doerman; Ivan Yehudi Hirsh, both of London, England

[73] Assignee: Molins Limited, Great Britain

[22] Filed: May 3, 1974

[21] Appl. No.: 466,839

[52] U.S. Cl. ................................................... 73/41
[51] Int. Cl.² ............................................ G01M 3/26
[58] Field of Search ...................... 73/41, 45.1, 45.2

[56] References Cited
UNITED STATES PATENTS

| | | | |
|---|---|---|---|
| 3,270,551 | 9/1966 | Schmalz | 73/45.1 |
| 3,580,053 | 5/1971 | Molins | 73/41 |
| 3,757,564 | 9/1973 | Blackburn et al. | 73/45.1 |
| R27,277 | 1/1972 | Williamson | 73/41 |

Primary Examiner—S. Clement Swisher
Attorney, Agent, or Firm—Craig & Antonelli

[57] ABSTRACT

A cigarette testing device comprises means to apply positive or negative pressure to one end of each cigarette; means defining a chamber around at least part of the cigarette, with seals around the cigarette to restrict communication between the interior of the chamber and atmosphere; and means to detect the pressure in the chamber during testing; and including means defining a predetermined deliberate leakage path between the chamber and atmosphere.

7 Claims, 7 Drawing Figures

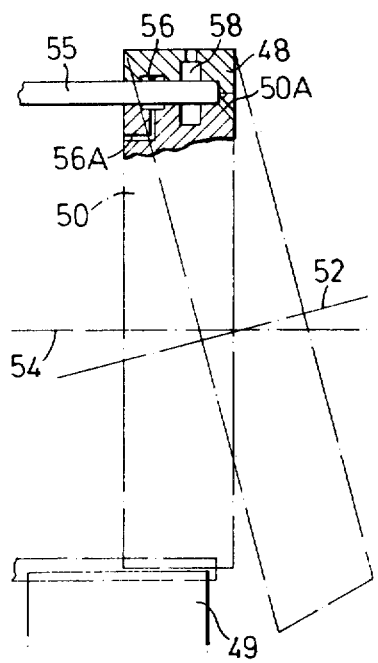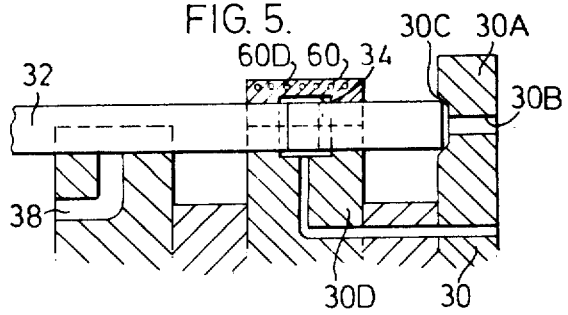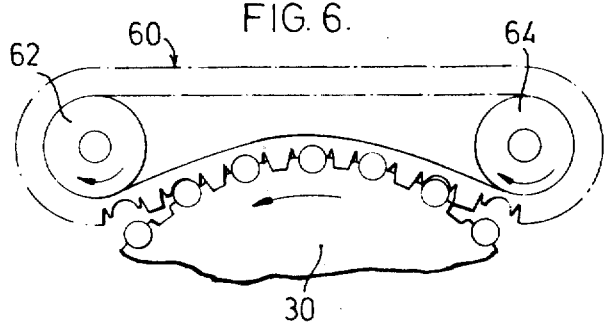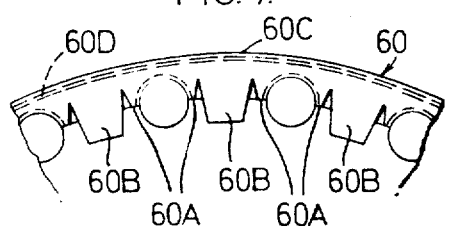

TESTING OF CIGARETTES

This invention is concerned with testing the wrappers of finished cigarettes, especially filter-tipped cigarettes.

According to one aspect of this invention a cigarette testing device comprises means to apply positive or negative pressure to one end of each cigarette (i.e. to create a pressure inside the wrapper which is different from atmospheric); means defining a chamber around at least part of the cigarette, with seals around the cigarette to restrict communication between the interior of the chamber and atmosphere; and means to detect the pressure in the chamber during testing; and including means defining a predetermined deliberate leakage path between the chamber and atmosphere.

The predetermined leakage path may be at least partly through at least one of the seals. In any event, the seals preferably have a clearance fit round the cigarette so as not to damage even the largest-diameter cigarette which may occur within manufacturing tolerances for a given nominal diameter. Preferably the total leakage flow is substantially greater than the variation of leakage through the seals due to the variations of cigarette diameter, so that the variable part of the leakage is swamped by the fixed part.

According to a second aspect of this invention, a cigarette testing device has a drum for carrying the cigarettes during testing, and an annular member which surrounds at least part of the drum and defines with the drum an annular space around each cigarette at a testing station, positive or negative pressure being supplied to the annular space or sensed in the annular space to detect the presence of an excessively leaking cigarette wrapping. Pressure may be supplied to one end of the cigarette at the testing station, and the pressure in the annular space may be monitored; alternatively, pressure may be supplied to the annular space, and the pressure may be monitored at one end of the cigarette.

The annular member may rotate about an axis parallel to the axis of the drum, the annular member having an internal diameter which is larger than the external diameter of the drum. Alternatively, the annular member may be frusto-conical in shape, with an axis of rotation inclined to that of the drum, so that the inside surface of the annular member is parallel to the outer surface of the drum at the testing station.

According to a third aspect of this invention, the wrapper of each cigarette is tested while at least part of the cigarette lies within an axial bore in a part of a testing drum, the bore having for example an internal shape defining an annular space around the cigarette in which the pressure is monitored during testing. Each cigarette is blown into the corresponding bore. For example, at least part of the length of the cigarette may be contained wholly within an axially extending flute in the drum, aligned with a corresponding one of the bores, and at least part of each flute may be substantially closed by a cowl to define a passageway containing the cigarette into which compressed air is fed to blow the cigarette into the corresponding bore in preparation for testing. Alternatively, each cigarette may be blown into the bore by an air jet issuing from a nozzle adjacent to one end of the cigarette, and the reflected pressure of the air jet, or the noise generated by the air jet, may be detected as an indication of the condition of the cigarette end, which in this case is preferably the tobacco-filled end; the detection of the end quality in this respect is basically as described in U.S. Pat. Nos. 3,720,311 or 3,483,970.

According to another aspect of this invention, each cigarette is carried during testing by a drum around part of which a belt extends, the belt having integrally moulded portions at regular intervals defining with the drum an annular space around each cigarette at a testing station whereby the cigarette is tested, for example by monitoring pressure in the annular space or by supplying pressure to the annular space and monitoring the pressure in an end space. The belt may have integrally moulded timing teeth engaging the drum, or may alternatively have teeth on the side remote from the drum and engaged by a drive gear.

Other aspects of this invention will become apparent from the following description of various examples of devices according to this invention shown in accompanying drawings. In the drawings:

FIG. 4 is a section, similar to FIG. 1, of a fourth device;

FIG. 5 is a section, similar to FIG. 1, of a fifth device including a flexible belt;

FIG. 6 is an end view in the direction of the axis of the device shown in FIG. 5; and FIG. 7 is an enlargement of part of part of FIG. 6.

Figure 1:
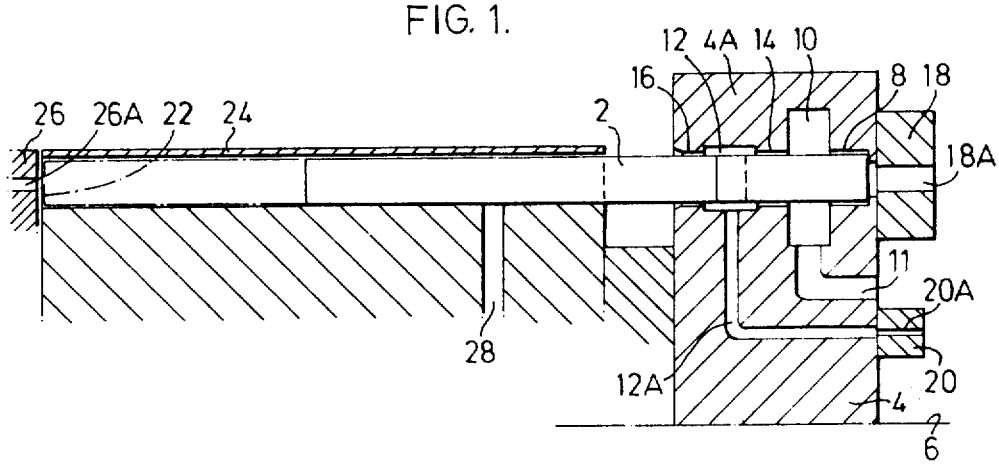
FIG. 1 is a section in a plane passing through the axis of the testing drum of one device.

FIG. 1 shows a cigarette 2 being tested while being carried by a testing drum 4 which rotates about an axis 6. During testing, part of the cigarette (including the filter) extends into an axial bore or passageway in a flange portion 4A of the drum. The internal wall of the bore includes a part 8 which fits closely around the end of the cigarette, a recessed part defining a large annular space 10, and a slightly recessed part defining an annular test space 12. Parts 14 and 16 of the bore are a fairly close fit around the cigarette but allow a predetermined leakage from the annular space 12 to atmosphere; for this purpose, and in order to ensure that the test space 12 is isolated from the pressure at the end of the cigarette, the annular space 10 is vented to atmosphere through a passageway 11.

The annular space 12 contains the edge of the "cork" strip by which the filter is joined to the tobacco-filled part of the cigarette, and the interface between the tobacco and the filter. During testing, pressure (either positive or negative) is supplied to a fixed manifold 18, passing through a passage 18A in the manifold and into the adjacent end of the cigarette. The pressure in the annular test space 12 is monitored by means of a transducer connected to a manifold 20 which communicates with the test space 12 via a passageway 12A. An additional predetermined leakage to atmosphere from the test space 12 may be provided by means of a restricted passage to atmosphere extending from the passage 20A in the manifold.

Each cigarette is delivered on to the drum 4 with its left-hand end initially at a position shown by the chain dotted line 22, at which stage the cigarette is contained substantially entirely within a flute in part of the drum which is closely surrounded by a cowl 24 curved about the axis of the drum. The cigarette is then blown through the flute and into the bore in the part 4A of the drum by means of compressed air supplied through a passage 26A in a fixed member 26 adjacent to the end of the drum. After testing, the cigarette is preferably blown out of the bore by means of compressed air supplied to the passage 18A. If the test is conducted by connecting positive pressure air to the manifold 18, the cigarette may be held against axial displacement out of the bore by means of suction applied through a radial passage 28 opening into the flute, or by means of an end stop which moves into the flute to about the left-hand end of the cigarette.

Figure 2:
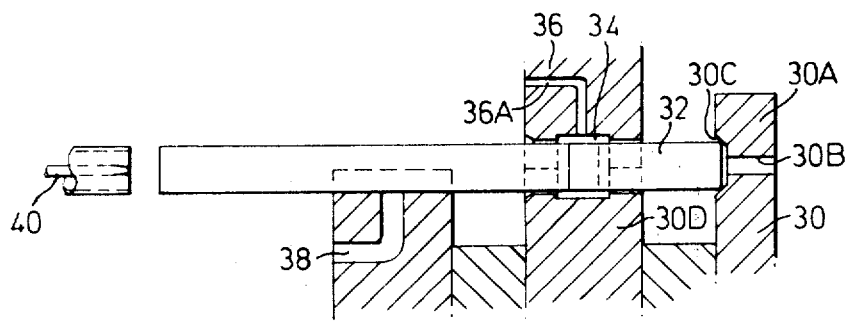
FIG. 2 is a part of a similar section of a second device.

FIG. 2 shows a cigarette testing device including a drum 30 by which the cigarettes are carried during testing. The drum includes a flange 30A having an axial passage 30B through which pressure is supplied to the adjacent end of the cigarette 32 at the testing station. A seal is formed in this instance by means of a conical seat 30C; the cigarette is blown against the conical seat but it may alternatively be sucked against the conical seat by means of suction applied to the passage 30B. The conical seat could alternatively be on a flexibly mounted member so as to be self aligning. An annular test space 34 is defined partly by a portion 30D of the drum 30 and partly by a second drum 36 which rotates about an axis parallel to that of the drum 30. The pressure in the test space is monitored by means of a tranducer connected via a passageway 36A in the drum 36, but may alternatively be monitored in the same manner as in FIG. 1.

The cigarette is held on the testing drum until just before the testing station by suction applied through a passage 38. Just before reaching the testing station, the cigarette is displaced axially slightly into the conical seat 30C by means of an air jet supplied through a pipe 40 forming part of an end testing device such as that shown in either of the above-mentioned U.S. patent specifications. Preferably the wrapper test is conducted by transmitting suction through the passage 30B so that the cigarette is held by the suction against the conical seat 30C, the air jet from the pipe 40 being terminated before the testing station.

Instead of the conical seat 30C there may be a parallel-sided (i.e. cylindrical) recess or bore for receiving the end portion of the cigarette.

The two-drum arrangement shown in FIG. 2 may be modified in various ways. For example, the drum 36 may be extended to the right and may co-operate with the drum 30 to form a seal around the right-hand end of the cigarette. Furthermore, the drums may be modified to define a test space which extends further to the left, and possibly over substantially the whole length of the cigarette; however, the passage 36A leading to the transducer or other sensing device preferably still leads into the test space at the position shown, so as to provide maximum sensitivity to leaks in the region of the filter joint, the test space being possibly of such small radial extent as to produce a pressure drop along the test space, giving reduced sensitivity to leaks nearer the left-hand end of the cigarette. The cooperating drums may in many respects be similar to those of the cigarette inspection device described in our British patent specification No. 1,217,203.

Figure 3:
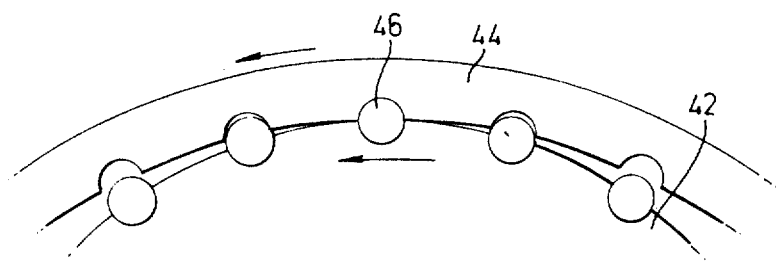
FIG. 3 is a fragmentary section in a plane normal to the axis of the testing drum of a third device.

FIG. 3 shows an alternative way of defining a testing space around the cigarette by means of the drum carrying the cigarette, together with a further rotary member. In this instance the cigarettes are carried by a drum 42, and the cooperating rotary member is an annular member 44 which has an internal diameter larger than the external diameter of the drum 42 and and rotates about an axis parallel to, but displaced from, the axis of the drum. The testing station is situated where the two members are closest together; that is to say, the cigarette 46 is at the testing station. The cigarettes are fed axially onto the drum 42 in a region where the annular member 44 is well spaced from the drum; this facilitates the feed of the cigarettes onto the drum, since the cigarettes do not have to enter a close-fitting bore.

A longitudinal section through the cigarette 46 may be basically similar to the arrangement shown in FIG. 4. However, FIG. 4 shows an arrangement in which an annular member 48 of frusto-conical shape partly surrounds a drum 50, the axis of rotation 52 of the member 48 intersecting and being inclined to the axis 54 of the drum. Thus the cigarettes can be fed transversely on to the drum near the bottom of the drum where the member 48 is clear of the drum. A cigarette 55 is shown at a testing station at which the drum and annular member 48 define between them a testing space 56, a larger-diameter annular space 58 which is vented to atmosphere, and close fitting parts around the cigarette elsewhere. Pressure is supplied to the filter end of the cigarette through a passage 50A in the drum, and the pressure in the test space 56 is monitored through a passage 56A.

FIGS. 5 to 7 show a further device which is similar to the device shown in FIG. 2 (as indicated by the use of the same reference numerals), except that the drum 36 in FIG. 2 is replaced by an endless belt 60. As shown in FIG. 6, the belt 60 extends around part of the circumference of the drum 30 and passes around end pulleys 62 and 64. The external face of the belt is moulded with projections 60A fitting closely round the outer halves of the cigarettes, and teeth 60B which engage in similarly shaped grooves in the drum so that the belt is driven at the same speed as the drum and in a timed relationship. Near the smooth surface 60C of the belt there are longitudinally extending reinforcing wires 60D. The belt is moulded of a flexible plastics material.

As an alternative, the driving and timing teeth 60B may project from the face 60C of the belt, in which case one of the pulleys 62 or 64 may be formed as a gear to drive the belt.

Instead of the path of the belt being as shown in FIG. 6, the belt may hang as an approximately oval loop from the drum, somewhat like the annular member 44 in FIG. 3, with a vertically movable pulley engaging or resting in the bottom of the loop to tension and/or possibly to drive the belt.

In all the examples shown, the test is described in terms of supplying pressure to the filter end of the cigarette and monitoring the pressure in a test space around the cigarette. As an alternative in each case, pressure could be supplied to the test space around the cigarette, and the monitoring may be of pressure at the end of the cigarette, preferably with provision for a predetermined leakage path between the end space and atmosphere.

We claim:

1. A cigarette testing device comprising means to apply pressure difference from atmospheric pressure to one end of each cigarette; means defining a chamber around at least part of the cigarette, with seals around the cigarette to restrict communication between the interior of the chamber and atmosphere; and means to detect the pressure in the chamber during testing; and including means defining a predetermined deliberate leakage path between the chamber and atmosphere.

2. A cigarette testing device according to claim 1 in which the predetermined leakage path is at least partly through at least one of the seals.

3. A cigarette testing device comprising a drum for carrying the cigarettes during testing, and an annular member which surrounds at least part of the drum and defines with the drum an annular space around each cigarette at a testing station, positive or negative pressure being supplied to the annular space or sensed in the annular space to detect the presence of an excessively leaking cigarette wrapping.

4. A cigarette testing device according to claim 3 in which the annular member rotates about an axis parallel to the axis of the drum, the annular member having an internal diameter which is larger than the external diameter of the drum.

5. A cigarette testing device according to claim 3 in which the annular member is frusto-conical in shape, with an axis of rotation inclined to that of the drum, so that the inside surface of the annular member is parallel to the outer surface of the drum at the testing station.

6. A cigarette testing device according to claim 3 in which cigarettes are fed on to the drum at a position along its circumference where the annular member is spaced from the drum.

7. A cigarette testing device according to claim 1 in which the wrapper of each cigarette is tested while at least part of the cigarette lies within an axial bore in part of a testing drum carrying the cigarette, at least part of the length of each cigarette being contained wholly within an axially extending flute in the drum aligned with a corresponding one of the bores, and at least part of the flute being substantially closed by a stationary cowl cooperating with the flute to define a passageway containing the cigarette into which compressed air is fed to blow the cigarette into the corresponding bore in preparation for testing.

* * * * *